United States Patent [19]

Sawusch et al.

[11] Patent Number: 4,571,778
[45] Date of Patent: Feb. 25, 1986

[54] DEVICE FOR THE AUTOMATIC SUPPLYING OF FISH TO FISH PROCESSING MACHINES

[76] Inventors: Axel W. Sawusch, 1860 Trögstad (Bilverlcsted), Norway; Günther Pinkerneil, II. Ochsenkoppel 7a, 2400 Lübeck, Fed. Rep. of Germany

[21] Appl. No.: 583,612

[22] Filed: Feb. 27, 1984

[30] Foreign Application Priority Data

Mar. 2, 1983 [DE] Fed. Rep. of Germany ....... 3307258

[51] Int. Cl.⁴ .............................................. A22C 25/08
[52] U.S. Cl. ........................................... 17/54; 17/61
[58] Field of Search .................. 17/54, 61, 55, 56, 58

[56] References Cited

U.S. PATENT DOCUMENTS

| | | | |
|---|---|---|---|
| 2,862,606 | 12/1958 | Schlichting | 17/55 X |
| 3,232,412 | 2/1966 | Blöss | 17/55 X |
| 3,309,730 | 3/1967 | Michael | 17/54 |
| 3,348,260 | 10/1967 | Bartels et al. | 17/55 |

Primary Examiner—Donald R. Schran
Attorney, Agent, or Firm—Edward F. Levy

[57] ABSTRACT

The invention concerns a device for the automatic supplying of fish uniformly aligned with respect to their belly-back position to fish processing machines, which device comprises a belly-back aligning section, from which the fish is delivered to a processing machine in a timed manner. It is the object of the present invention to universalize the scope of use of known belly-back aligning sections in order to enable the handling of the great percentage of damaged fish which occurs due to set or drift net fishing. The increased danger of blocking of such aligning sections by damaged fish is avoided according to the invention in that the passage for the fish through the aligning section is opened by force shortly before the arrival of the next fish, respectively.

12 Claims, 3 Drawing Figures

U.S. Patent   Feb. 25, 1986   4,571,778
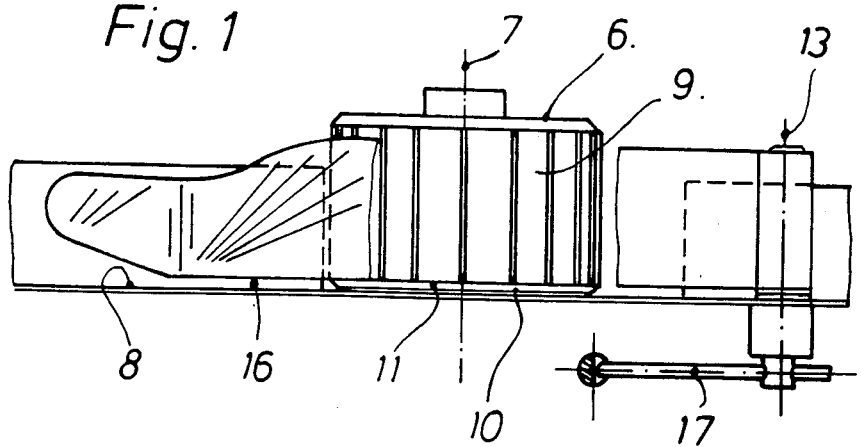
Fig. 1
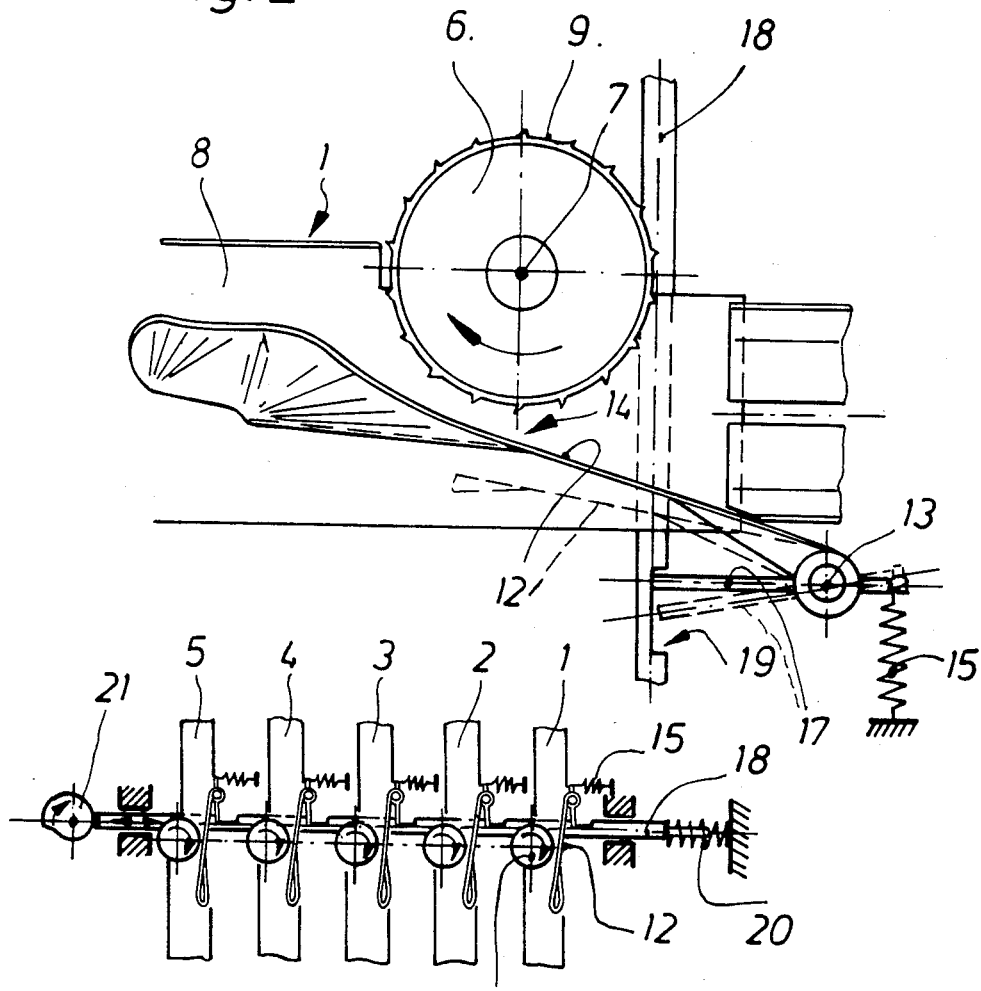
Fig. 2
Fig. 3

DEVICE FOR THE AUTOMATIC SUPPLYING OF FISH TO FISH PROCESSING MACHINES

BACKGROUND OF THE INVENTION

1. Field of the Invention

The invention concerns a device for the automatic supplying of fish to fish processing machines, the device comprising a belly-back aligning section for aligning the fish in uniform belly-back position as well as for timed transferring of the same, which aligning section comprises at least one guide channel for receiving fish singly one after the other head first, the channel guiding the fish to an essentially vertical gap formed between a circumferential surface of a toothed roller and a guiding surface arranged opposite the toothed roller and yielding resiliently.

2. Description of Prior Art

A device with the features of the above species is known from DE-PS 1 454 092. In this device the fish already aligned head first are led to a belly-back aligning section according to a pulse sequence determined by a fish processing machine situated downstream. This belly-back aligning section consists of a driven toothed roller which extends perpendicularly into a guide channel for the fish. A guiding surface is arranged resiliently at a distance opposite the circumferential surface of the toothed roller, the front end of the guiding surface being twisted. The fish, accelerated by a pulse device, are brought between the circumferential surface and the guiding surface where, independent of their belly-back position, they are lifted up into the swimming position due to their drop-shaped cross-section. Subsequently they are turned from this position into a uniform side position by means of the twisted end of the guiding surface.

This device has proved to be very reliable in practice so long as fish come to be processed in a good quality condition. These conditions cannot be safeguarded, however, with catches made by set or drift nets. This kind of fishing, which has been known for a long time, is used more today due especially to its energy saving effect and the better selection of size which can be achieved. In this kind of fishing it is unavoidable that a relatively large portion of the fish thus caught reach the processing machine in a damaged condition. These damages are caused by the fish having to be picked or shaken out of the meshes after such nets have been hauled in, with the consequence that the gill structure and sometimes also the lower jaw are ripped off, or they break or crack. Fish thus damaged as well as possible undesired additional catch increase the danger of jamming or congestion, especially of the belly-back aligning section of such a supplying machine. If this occurs then the respective path is blocked with the consequence that the subsequent fish congest. Such a blocking has to be removed manually, for which purpose at least one operator is necessary so that the rationalisation effect of such an arrangement is at least partially lost.

3. Objects of the Invention

It is therefore an essential object of the invention to avoid such type of obstruction. It is another object of the invention to universalise the scope of application of known belly-back aligning arrangements thus to enable the handling of damaged fish occurring to a much greater extent in set or drift net fishing.

SUMMARY OF THE INVENTION

In order to achieve this object in a device for the automatic supplying of fish to fish processing machines, which device comprises a belly-back aligning section for aligning the fish in uniform belly-back position as well as for timed transferring of the same, and in which device the aligning section comprises at least one guide channel for receiving fish singly one after the other head first, such channel guiding the fish to an essentially vertical gap formed between a circumferential surface of a toothed roller and a guiding surface arranged opposite the toothed roller and yielding resiliently, it is proposed according to the invention that the guiding surface be arranged to be controlled to move away from the circumferential surface of the toothed roller in time with the fish sequence.

It is thus achieved that a possible obstruction of the belly-back aligning section is always broken up in time before the arrival of the next fish, thus avoiding a jam. The controlled moving away of the guiding surface occurs preferably in the pulse interval between two fish.

For reasons of simplified construction it is expedient in a multiple path plant if the guiding surfaces of each path can be controlled to move away via a common rod. The distance between the guiding surfaces and the respective circumferential surfaces of the toothed rollers can be adjusted centrally via the rod.

In order to secure that a stuck fish can nevertheless leave the belly-back aligning section in aligned condition the controlled moving away of the guiding surfaces may advantageously occur at slowly increasing speed and their return movement at high speed.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a side view of the belly-back aligning section according to the invention, FIG. 2 shows a top view of this device, FIG. 3 shows a partial top view of a multiple path embodiment of the device.

DETAILED DESCRIPTION OF THE PREFERRED EMBODIMENT

A plurality of guide channels 1 to 5 are arranged in a frame of a device for aligning fish guided head first in a uniform head-tail position not shown in detail, along which channels the fish are guided. A toothed roller 6 is positioned in the region of the end of each guiding channel, e.g. channel 1, facing a processing machine to be supplied with fish, which roller, laterally offset, rotates about an axis 7 essentially perpendicular to the bottom surface of the guide channel 1. The driving of the toothed roller 6 ensues such that its circumferential surface 9 projecting into the guiding channel 1 is moved in the direction of the mentioned end facing the machine. The transitional area between the circumferential surface 9 and the front face 10 of the toothed roller 6 facing the bottom surface is formed by a bevel 11. A guiding surface 12 pivotal about an essentially vertical pivot axis 13 positioned next to the guide channel 1 and upstream of the toothed roller 6 when seen in the direction of movement of the fish lies opposite the circumferential surface 9. The guide surface 12 together with the circumferential surface 9 of the toothed roller 6 forms an essentially parallel passage 14 which can be enlarged by displacement against the force of a spring 15. The guide surface 12 ends in a twisted portion continued via the place of the guide surface's greatest proximity to the circumferential surface 9 and with its lower surface forms a gap 16 with respect to the bottom surface 8. A stop lever 17 connected rigidly with the guide surface 12 is secured to the end of the pivot axis 13 reaching below the bottom surface 8, which lever 17 with its free end engages a recess 19 of a rod 18 in the form of an adjusting or setting bar. One shoulder of the recess 19 serves as a stop for the stop lever 17. The setting bar is axially charged by a spring 20 which holds it pressed against the circumference of a control cam 21 which is driven timed synchronously with the fish processing machine positioned downstream.

The method of operation of the device is described in the following, taking one working path into consideration:

The fish, coming from a suitable head-tail aligning section, reach the passage 14 between the guiding surface 12 and the circumferential surface 9 of the guide channel 1 singly, head first, lying in sidewise position on the bottom surface 8 of the guide channel, thus to be engaged in a conveying manner by the toothed roller 6. When gripped and conveyed by the roller 6, the fish passes between said roller and the guiding surface 12 through the narrow passage 14, and bears against said guiding surface 12, causing it to move downwardly, as viewed in FIG. 2, and turn about pivot axis 13, thereby moving the attached stop lever 17 in the same direction, against tension of spring 15, as indicated in broken line in FIG. 2. Due to the drop-shaped cross-section of the fish body with burr-like belly contour according to its position the fish with this contour either runs under the bevel 11 of the toothed roller 6 or penetrates the gap 16 between the bottom surface 8 and the lower edge of the guiding surface 12. The pressure exerted on the guiding surface 12 by means of the spring 15 effects that the fish rights itself into the swimming position by displacement of the guiding surface 12. From this position it is then brought into uniform side position by means of the twisted portion of the guiding surface 12.

The fish to be conveyed simultaneously in the guide channels 1 to 5 (FIG. 3) are supplied in a timed manner from the aformentioned head-tail aligning section. The fish are supplied in cycles or pulses, that is, five fish at a time, each in a respective channel 1-5. If one fish in any pulse has been damaged, it would ordinarily jam in the passage 14 of its respective channel since the guiding surface 14 can only move with its connected lever 17 about pivot 13 between the limits provided by the two end shoulders of the recess 19 in the stationary bar 18 during the passage of one cycle or pulse of the fish. Such damaged fish would therefore cause an unavoidable obstruction to all subsequent fish arriving in the blocked channel, and the function of the channel would be lost until the fish causing the obstruction is discovered and manually removed.

The present invention provides cam means for automatically releasing such damages fish which have become jammed in the channel 14, for example by catching in bevel 11 or gap 16. The control cam 21 is driven to rotate, in the direction of the arrow in FIG. 3, in synchronization with the timing of the fish supply so that it makes one complete revolution during one pulse or cycle of the fish supply. After one cycle of fish has passed through channels 1-5, and before the next cycle of fish arrives, the rise portion of cam 21 engages and pushes rod 18 to the right, as viewed in FIG. 3, against the tension of compression spring 20. Such movement of rod 18 corresponds to a downward movement thereof as viewed in FIG. 2, and results in the upper end shoulder of recess 19 pressing the free end of lever 17 downwardly to cause pivoting movement of lever 17 in a counter-clockwise direction about the pivot axis 13 and against tension of the spring 15. This pivoting movement of lever 17 causes the attached guide surface 12 to move in the same direction, thereby widening the gap or passage 14 to allow a fish causing an obstruction to be released for passage automatically, without the need for manual release. If other fish sizes are to be processed, then the basic position of the rod 18, determining the stops for the guiding surfaces of each path, is changed to by means of a suitable adjusting device (not shown), thus changing the width of passage 14.

What is claimed is:

1. A device for the automatic supplying of fish having a head end, a back and a belly to a fish processing machine, said device comprising:
   a belly-back aligning section for aligning said fish in uniform belly-back position as well as for transferring said fish thus aligned to said processing machine in timed cycles of successive pulses,
   said aligning section comprising an aligning path including guide channel means, toothed roller means having a circumferential surface and resiliently-yielding guiding surface means disposed opposite said toothed roller means and forming a gap therebetween,
   said guide channel means being arranged to receive said fish singly in said successive pulses with said head end leading and to guide said received fish to said gap, and
   control means operable in timed sequence for automatically moving said guiding surface means away from said circumferential surface at predetermined intervals, whereby to increase the size of said gap sufficiently to release any fish jammed in said guide channel means.

2. A device as claimed in claim 1, wherein said predetermined intervals are intervals between two successive pulses.

3. A device as claimed in claim 1, wherein said aligning section includes a plurality of aligning paths, and in which said control means comprises a common rod coupled to said guiding means of each of said aligning paths for moving said guiding means simultaneously.

4. A device as claimed in claim 2, wherein said aligning section includes a plurality of aligning paths, and in which said control means comprises a common rod coupled to said guiding means of each of said aligning paths for moving said guiding means simultaneously.

5. A device as claimed in claim 3, wherein said common rod is adapted to adjust the size of said gaps of each of said aligning paths.

6. A device as claimed in claim 4, wherein said common rod is adapted to adjust the size of said gaps of each of said aligning paths.

7. A device as claimed in claim 1, wherein said control means includes means for moving said guiding surface means away from said circumferential surface at a slowly increasing speed, and returns said guiding surface means toward said circumferential surface at a relatively higher speed.

8. A device as claimed in claim 2, wherein said control means includes means for moving said guiding surface means away from said circumferential surface at a slowly increasing speed, and returns said guiding surface means toward said circumferential surface at a relatively higher speed.

9. A device as claimed in claim 3, wherein said control means includes means for moving said guiding surface means away from said circumferential surface at a slowly increasing speed, and returns said guiding surface means toward said circumferential surface at a relatively higher speed.

10. A device as claimed in claim 4, wherein said control means includes means for moving said guiding surface means away from said circumferential surface at a slowly increasing speed, and returns said guiding surface means toward said circumferential surface at a relatively higher speed.

11. A device as claimed in claim 5, wherein said control means includes means for moving said guiding surface means away from said circumferential surface at a slowly increasing speed, and returns said guiding surface means toward said circumferential surface at a relatively higher speed.

12. A device as claimed in claim 6, wherein said control means includes means for moving said guiding surface means away from said circumferential surface at a slowly increasing speed, and returns said guiding surface means toward said circumferential surface at a relatively higher speed.

* * * * *